United States Patent Office 3,542,919
Patented Nov. 24, 1970

3,542,919
ASTRINGENT ALKALI METAL ALUMINUM COMPLEXES OF HYDROXY ACIDS
William F. Buth and Waldemar J. Wick, Milwaukee, Wis., assignors to Wickhen Products, Inc., Milwaukee, Wis., a corporation of Wisconsin
No Drawing. Filed June 4, 1956, Ser. No. 588,987
Int. Cl. A61k 7/00
U.S. Cl. 424—68       8 Claims

ABSTRACT OF THE DISCLOSURE

The invention relates to antiperspirant compositions containing alkali metal salts of aluminum complexes of hydroxy acids. The hydroxy acids are glycolic, gluconic, lactic and alpha hydroxy iso-butyric acids.

---

This invention relates to an astringent material and to a process for preparing the same, and more particularly to an astringent material to be used as an antiperspirant ingredient in cosmetic products.

The conventional astringent and antiperspirant materials reduce body odor by a method of which the material is believed to react with the skin tissue by a protein precipitation reaction to narrow the orifices of the sweat glands and thereby reduce the amount of perspiration. Aluminum compounds, in general, have been known for many years as astringent materials, and water soluble aluminum salts such as aluminum chloride and aluminum sulphate have been used extensively for antiperspirant purposes. The aluminum compound is generally dissolved in water and used, as such, as an antiperspirant, or the aqueous solution is emulsified with an oil phase.

While the aluminum compounds do restrict the flow of perspiration, solutions containing these aluminum salts have a low pH, for the aluminum salts can remain in solution only in compounds having a pH of less than about 4. A pH in the range of 2.5 to 4, as characterized by cosmetics containing aluminum compounds, tends to cause burning of abraded skin and also tends to rot or destroy clothing. Many attempts have been made to raise the pH of cosmetic materials containing aluminum compounds but they have proved unsuccessful due to the precipitation of aluminum hydroxide as the pH was raised above 4.

More recently, aluminum chlorohydrate was developed as an antiperspirant material. With the use of this compound it is possible to obtain a pH of 4.4 in a cosmetic preparation without precipitating aluminum hydroxide. While this increased pH reduced skin burning and lessened the danger of rotting clothing, the pH was still substantially below the desired neutral range of 6–8.

In an atempt to eliminate the difficulties encountered with the acidic aluminum compounds, zirconium antiperspirant materials have been developed. However, the zirconium compounds are more irritating to the skin than the aluminum compounds and are generally thought to be less effective in reducing the flow of perspiration.

The present invention is directed to a water soluble compound having the excellent astringent properties characterized by aluminum compounds and having the ability to remain in aqueous solution throughout the pH range of 2.5–11.

According to the invention, the astringent or antiperspirant material consists of an alkali metal aluminum complex of an aliphatic hydroxy acid selected from the group consisting of glycolic, gluconic, lactic and alpha hydroxy isobutyric and is believed to have the following formula as isolated in the 7–8 pH range:

$$XAlR_2 \cdot YH_2O$$

where X is an alkali metal selected from the group consisting of sodium and potassium, R is an acid radical selected from the group consisting of glycolic, gluconic, lactic and alpha hydroxy iso-butyric and Y is an integer having a value sufficient to provide the composition, as sodium aluminum lactate complex, with an approximate molecular weight of 355 to 365.

The complex is prepared generally by reacting two mols of the alkali metal hydroxide, such as sodium hydroxide, with one mol of aluminum metal to produce what is thought to be sodium aluminate with an excess of one mol of sodium hydroxide ($NaAlO_2 \cdot NaOH$). Two mols of the hydroxy acid are added to this product to provide the sodium aluminum acid complex. The complex thus formed has a pH of about 11, and is believed to have the following formula:

$$Na_2AlR_2 \cdot YH_2O$$

where R and Y are defined as above. This complex is a stable, water soluble compound in which the pH can be varied throughout the range of 2.5–11, without precipitation of aluminum hydroxide, by adding either an acid or a base. It is believed that the reason that the aluminum does not precipitate as aluminum hydroxide, is because the aluminum is held by the organic radical of the complex. If, for example, a solution of aluminum chloride were to be increased in pH above for normal value of about 3–4 by the addition of a caustic material, the aluminum would precipitate as aluminum hydroxide. In contrast to this, in the present instance, the hydroxy acid radical is believed to hold the aluminum so that no precipitate will occur as a solution of the complex is varied throughout the above pH range.

It was heretofore believed that soluble aluminum salts would not remain in solution when the pH was increased above 4.4. This invention provides an aluminum compound having excellent antiperspirant qualities that will remain in aqueous solution throughout a pH range of 2.5 to 11.0.

As an example of the preparation of the present compound, two mols (80 grams) of 100% sodium hydroxide are added to one mol (27 grams) of aluminum in the form of 1/16 inch thick strip. 150 grams of water are also added to these materials.

A rapid reaction occurs without the addition of heat with a vigorous evolution of hydrogen. Cooling is used to control the rate of reaction and after about a half hour the reaction is completed. The resulting product is a clear stable liquid which is filtered to eliminate extraneous material.

Two mols (180 grams) of 100% lactic acid are then admixed with the above liquid. The mixture is made slowly with constant stirring. A small amount of heat is liberated in the reaction and cooling is employed to maintain the temperature of the mixture below 40° C. If the temperature is permitted to go above 40° C. or if the mixture is made too rapidly, a precipitate of a hydroxide will result.

The resulting complex is a stable clear liquid having a slight yellowish cast. The complex has a pH of approximately 10.9 and has a relatively high viscosity.

To adjust the pH of the complex to the preferred range of 6 to 8, one mol (98.6 grams of a 37% solution) of hydrochloric acid was added to the reaction product and the resulting complex has a pH of approximately 7.0.

The astringent material can also be prepared by mixing one mol (40 grams) of sodium hydroxide and 150 grams of water with one mol (150 grams) of sodium aluminate, $Na_2AlO_2 \cdot H_2O$. To this product two mols of glycolic acid are added, as in the first method of preparation, and the resulting reaction product is lowered in pH by mixing with an acid as described above.

A third method of preparation of the antiperspirant material consists of adding one mol (214 grams) of aluminum chloride, $AlCl_3 \cdot 6H_2O$, to two mols (180 grams) of 100% lactic acid and 150 grams of water. The resulting product is neutralized with four mols (160 grams) of sodium hydroxide. As in the case of the first method of preparation, the sodium hydroxide is added slowly with constant stirring and the temperature of the mixture is maintained below 40° C. In this method, three mols of the sodium hydroxide are used to unite with the chloride as sodium chloride. On evaporating the complex to a 50% concentration, 90% of the NaCl crystallizes out and can be filtered off.

While the above description of the preparation was directed to the use of sodium hydroxide, it is contemplated that potassium hydroxide can be substituted for the sodium hydroxide. Similarly, the complex can be adjusted to a lower pH with any desired acid, such as hydrochloric acid, lactic acid, sulphuric acid, acetic acid or the like, or the complex can also be lowered in pH by using an acidic salt, such as aluminum chloride or aluminum sulphate.

The astringent material of the invention has excellent antiperspirant qualities, as characterized by aluminum compounds in general, and can exist in solution throughout the pH range of 2.5–11. This is a definite advantage over that of other aluminum antiperspirant materials which can remain in solution only in pH concentrations of less than 4.4. The stability of the present compound throughout the wide pH range enables the compound to be used in a wider variety of cosmetic bases, and when used with a pH in the range of 6–8, it substantially reduces skin burning and fabric destruction associated with other aluminum antiperspirant materials.

An aqueous solution of the alkali metal aluminum complex of the hydroxy acid can be employed as an antiperspirant material, or an aqueous solution of the complex can be emulsified with an oil phase to provide a cosmetic lotion or cream having the complex dispersed therein as the active antiperspirant ingredient. In these cases the aqueous solution itself or the oil or cream can be adjusted in pH, as desired, throughout the 2.5 to 11.0 range without danger of the precipitation of aluminum hydroxide.

One useful form of the complex is a simple water solution in which the water comprises from about 50% to 90% by weight of the solution and the remainder is the alkali metal aluminum acid complex.

A specific example of a water solution preparation is as follows in weight percent:

| | Percent |
|---|---|
| Sodium aluminum lactate complex | 15.0 |
| Water | 85.0 |

The complex can also be used in an aqueous alcohol solution having the following composition by weight:

| | Percent |
|---|---|
| Alcohol | 5–60 |
| Alkali metal aluminum complex of hydroxy acid | 5–20 |
| Water | Balance |

A specific illustration of an aqueous alcohol solution is as follows in weight percent:

| | Percent |
|---|---|
| Alcohol | 30 |
| Sodium aluminum gluconate complex | 15 |
| Water | 55 |

In addition, when the water solution is employed for cosmetic purposes a small amount of perfume and a suitable emulsifier for the perfume, such as sorbitan monolaurate, monopalmitate and monostearate polyoxyethylene derivatives sold under the name "Tween 20," can be used in the composition. A specific example of a composition such as this in weight percent is as follows:

| | Percent |
|---|---|
| Sodium aluminum glycolate complex | 18.0 |
| Perfume | 1.0 |
| Emulsifier | 2.0 |
| Water | 79.0 |

A lotion can be prepared using the above composition and incorporating a small amount of any of the commonly accepted thickeners, such as glycerol monostearate, carboxyl methylcellulose, gums, etc.

The astringent material of the present invention can also be incorporated into cream bases. The cream base forming materials may vary widely in composition, but, in general, include an oil phase which is dispersed by a suitable emulsifier in a water phase which contains the alkali metal aluminum hydroxy acid complex of the invention.

The oil phase may include both synthetic and natural oils, fats and waxes; such as vegetable oil, mineral oil, paraffin, sterol, spermaceti and other esters of fatty acids.

The emulsifier may take the form of partial esters of fatty acids with glycerine, glycol, or other polyhydric alcohols and their polyoxyethylene ethers, including stabilizers such as sodium salts of sulfated monoglycerides of cocoanut oil fatty acids, sodium alkyl sulfate, salts of alkyl aromatic sulfonates, etc. Specific examples of conventional emulsifiers are, sorbitan monolaurate and sodium $\beta$-oleylethane amide sulfonate.

A specific example of a cream preparation incorporating sodium aluminum lactate complex is as follows in weight percent:

| | Percent |
|---|---|
| Mineral oil | 3.0 |
| Glycerol monostearate | 15.0 |
| Spermaceti | 3.0 |
| Sodium aluminum lactate complex | 15.0 |
| Sorbitan monostearate polyoxyethylene derivative | 2.0 |
| Glycerine | 10.0 |
| Perfume | 1.0 |
| Water | 51.0 |

The astringent material of the invention may also be incorporated in a soap gel stick. Soap gel sticks are, in general, composed of a soap, an alcohol and water. The gel stick has proven a very desirable means for applying active ingredients, such as antiperspirant materials, to the skin for they have a pleasant cooling effect and are not messy in use.

Soap gel sticks are very sensitive to chemical reaction, and heretofore it has been considered impossible to produce a soap gel stick containing aluminum. The soap gel has an alkaline pH in the range of 8.9 to 9.0 and the addition of an aluminum antiperspirant compound, such as aluminum chloride, would result in the precipitation of aluminum soaps and aluminum hydroxides due to the fact that the aluminum compound could not exist in solution at a pH over about 3.5. In view of this a soap gel stick has heretofore never been produced which contains a water soluble aluminum antiperspirant material. There have been attempts to mechanically disperse the water insoluble aluminum compounds, such as aluminum oxide and hydroxide, in a gel stick, but these aluminum compounds do not possess the required antiperspirant properties.

Contrary to the formerly accepted theories, the alkali metal aluminum lactate complex of the invention can be incorporated in a soap gel stick without precipitation of aluminum compounds in the stick. This unusual result is believed to occur because the complex is stable throughout the pH range of 2.5 to 11, and therefore the complex will remain in solution when added to an alkaline soap gel base.

The relative proportions of soap, alcohol, water and alkali metal aluminum complex of hydroxy acid in the gel stick may vary throughout wide ranges and the specific proportions are chosen to provide a stick having the firmness, stability and effectiveness against perspiration desired. The soap gel stick incorporating the alkali metal aluminum complex of a hydroxy acid as the active antiperspirant ingredient may have the following range of composition:

| | Percent |
|---|---|
| Alkali metal aluminum complex of hydroxy acid | 5–25 |
| Soap | 5–40 |
| Water | 3–20 |
| Alcohol | Balance |

The soap may take the form of an alkali metal, such as sodium, salt of a saturated aliphatic fatty acid having from 12 to 22 carbon atoms, such as myristic acid, stearic acid, palmitic acid, lauric acid, behenic acid, tridecylic acid and the like. Instead of the sodium salt of the fatty acid, equivalent parts of the acid and sodium hydroxide may be used to form the gel stick. In such a case, in which the soap is formed during the making of the stick, the amount of water formed during the saponification process should be taken into consideration with respect to the final concentration of water in the gel stick.

The alcohol can be any alcohol generally used in a gel stick of this type. Ethyl alcohol and propyl alcohol or mixtures thereof are examples of alcohol that are generally used in gel stick compositions.

Specific examples of the composition of soap gel sticks using an alkali metal aluminum lactate complex as the active ingredient are as follows in weight percent:

(I)

| | Percent |
|---|---|
| Sodium stearate | 7.0 |
| Sodium aluminum glycolate complex | 15.0 |
| Ethyl alcohol | 65.0 |
| Water | 13.0 |

(II)

| | |
|---|---|
| Sodium behenate | 6.0 |
| Sodium aluminum lactate complex | 18.0 |
| Ethyl alcohol | 62.0 |
| Water | 14.0 |

In addition to the above mentioned ingredients, small amounts of perfume, coloring matter, deodorants, moisture-retention agents or other usual cosmetic additives may be added to the gel stick composition.

A specific example of the preparation of the gel stick using sodium aluminum glycolate complex is as follows:

7 grams of sodium stearate are dissolved in 63 grams of ethyl alcohol by refluxing at about 75° C. This mixture has a pH of about 8.4 when diluted with an equal volume of water. 30 grams of a 50% water solution of sodium aluminum glycolate complex having a pH of about 8.5 was then heated to about 70° C. and added to the mixture. The resulting mixture was thoroughly agitated, and then poured into stick form and cooled. The stick has a pH of about 8.4 and was firm and stable and showed no evidence of any precipitate.

The present invention provides a water soluble aluminum complex having excellent astringent properties and which will remain in solution throughout a pH range of 2.5 to 11.0 without the precipitation of insoluble aluminum compounds. This feature permits the complex to be used in a substantially wider variety of cosmetics and medicinal products than the usual aluminum compounds which have astringent characteristics.

Various modes of carrying out the invention are contemplated as being within the scope of the following claims particularly, pointing out and distinctly claiming the subject matter which is regarded as the invention.

I claim:

1. A cosmetic preparation comprising, a cosmetic base, and an effective antiperspirant amount of an active antiperspirant ingredient having the following formula as isolated at a pH of approximately 7 to 8:

$$XHAlR_2 \cdot YH_2O$$

where X is an alkali metal selected from the group consisting of sodium and potassium, R is an acid radical selected from the group consisting of glycolic, gluconic, lactic and alpha hydroxy iso-butyric, and Y is an integer having a value sufficient to provide the complex with an approximate molecular weight of 355 to 365 when using sodium as X and lactic as R.

2. A cosmetic preparation, comprising a carrier having dispersed therein as an active antiperspirant ingredient an effective antiperspirant amount of an alkali metal aluminum complex of an aliphatic hydroxy acid selected from the group consisting of glycolic, gluconic, lactic, and alpha hydroxy iso-butyric, said alkali metal being selected from the group consisting of sodium and potassium and said aluminum and said acid being present in the molar ratio of one mol of aluminum to two mols of said acid.

3. An antiperspirant alcohol gel stick, comprising a sodium salt of a saturated aliphatic fatty acid having from 12 to 22 carbon atoms, and an effective antiperspirant amount of an alkali metal aluminum complex of an aliphatic hydroxy acid selected from the group consisting of glycolic, gluconic, lactic, and alpha hydroxy iso-butyric, as an antiperspirant ingredient, said alkali metal being selected from the group consisting of sodium and potassium and said aluminum and said acid being present in the molar ratio of one mol of aluminum to two mols of said acid.

4. An antiperspirant alcohol gel stick comprising, by weight about 5.0% to 40.0% of a sodium salt of a saturated aliphatic fatty acid having from 12 to 22 carbon atoms, about 5.0% to 25.0% of an alkali metal aluminum complex of an aliphatic hydroxy acid selected from the group consisting of glycolic, gluconic, lactic, and alpha hydroxy iso-butyric, said alkali metal being selected from the group consisting of sodium and potassium and said aluminum and said acid being present in the molar ratio of one mol of aluminum to two mols of said acid, about 3.0% to 20.0% water, and the balance alcohol.

5. A solid antiperspirant alcohol gel stick, comprising a sodium salt of a saturated aliphatic fatty acid having from 12 to 22 carbon atoms, and an effective antiperspirant amount of sodium aluminum lactate complex having the following formula as isolated in the pH range of 7 to 8:

$$NaHAlR_2 \cdot YH_2O$$

where R is a lactic acid radical and Y is an integer of value sufficient to provide the complex with an approximate molecular weight in the range of 355 to 365.

6. A cosmetic preparation, comprising a water phase, an oil phase dispersed with said water phase, and an effective antiperspirant amount of an alkali metal aluminum complex of an aliphatic hydroxy acid selected from the group consisting of glycolic, gluconic, lactic, and alpha hydroxy iso-butyric, dissolved in said water phase and functioning as an active antiperspirant ingredient therein, said alkali metal being selected from the group consisting of sodium and potassium and said aluminum and said acid being present in the molar ratio of one mol of aluminum two mols of said acid.

7. A cosmetic preparation comprising, an aqueous carrier, and an effective antiperspirant amount of an alkali metal aluminum complex of an aliphatic hydroxy acid selected from the group consisting of glycolic, gluconic, lactic, and alpha hydroxy iso-butyric, dissolved in said carrier, said alkali metal being selected from the group consisting of sodium and potassium and said aluminum and said acid being present in the molar ratio of one mol of aluminum to two mols of said acid, said complex being characterized by the ability to remain in aqueous solution throughout the pH range of 2.5 to 11.0.

8. An antiperspirant composition comprising a vehicle having an aqueous phase and having dissolved therein in aqueous solution sodium aluminum lactate and at least one inorganic aluminum salt selected from the group consisting of aluminum sulfate and aluminum chloride.

References Cited

UNITED STATES PATENTS 2,732,327  1/1956  Teller _____ 424—66

FOREIGN PATENTS 336,922  10/1930  Great Britain.
465,269  5/1950  Canada.

OTHER REFERENCES

DeNavarre: The Chemistry and Manufacture of Cosmetics, D. Van Nostrand Co., Inc., New York, 1941, pp. 261-262.

ALBERT T. MEYERS, Primary Examiner

V. C. CLARKE, Assistant Examiner

U.S. Cl. X.R.

260—448; 424—365

UNITED STATES PATENT OFFICE
CERTIFICATE OF CORRECTION

Patent No. 3,542,919                      Dated  November 24, 1970.

Inventor(s)   William F. Buth and Waldemar J. Wick

It is certified that error appears in the above-identified patent and that said Letters Patent are hereby corrected as shown below:

Column 4, line 53, Delete "8.9" and substitute therefor ---8.0
Column 6, line 63, After "Aluminum" insert ---to---

Signed and sealed this 6th day of April 1971.

(SEAL)
Attest:

EDWARD M. FLETCHER, JR.                WILLIAM E. SCHUYLER, JR.
Attesting Officer                      Commissioner of Patents